[11] 3,597,965

[72] Inventor Toshihiko Kawamura
 Tokuyamashi, Japan
[21] Appl. No. 863,304
[22] Filed Oct. 2,
[45] Patented Aug.
[73] Assignee Idem Co., Ltd.
 Tok:
[32] Priority Oct.
[33] Japa.
[31] 3/741.

[54] METHOD AND APPARATUS FOR MEASURING PENETRATION AUTOMATICALLY
2 Claims, 2 Drawing Figs.

[52] U.S. Cl. . . . 73/81,
 73/15.4, 340/282
[51] Int. Cl. . . . G01n 3/48,
 G01n 25/02, G08b 21/00
[50] Field of Search. . . . 73/81, 83,
 104, 105, 78, 15.4, 15, 340/282

[56] References Cited
UNITED STATES PATENTS
2,554,206 5/1951 Pearson et al. ... 73/83
2,699,540 1/1955 Hunter ... 73/81
OTHER REFERENCES
ASTM 5-61, 1961

Primary Examiner—Richard C. Queisser
Assistant Examiner—Ellis J. Koch
Attorney—Fred C. Philpitt ABSTRACT: Method and apparatus for measuring penetration of pasty materials, such as petroleum asphalt. The apparatus consists of a measuring needle and standard weight associated with a penetration gauge. The needle and weight are fixedly attached to the stem of the penetration gauge then the combination is movable in the vertical direction by an elastic yarn. The entire operation is controlled by a timer so as to eliminate human errors in the measurement process. First the needle, weight and stem are raised by vertical motion of the yarn to a predetermined point. The position of the needle, weight and stem cause the penetration gauge pointer to indicate slightly greater than a zero reading. This position is sensed by photoelectric means which stops the upward motion of the yarn, needle, weight and stem. At the same time a worktable carrying the sample to be measured contact the needle a shock is transmitted through the needle to the stem causing the pointer of the penetration gauge to move to the zero reading position and at the same time expose one of the photoelectric cells. This stops the upward motion of the worktable and through the action of a timer releases the needle, weight and stem for the penetration measurement. At the end of the predetermined measurement phase the penetration can be read off the penetration gauge dial.

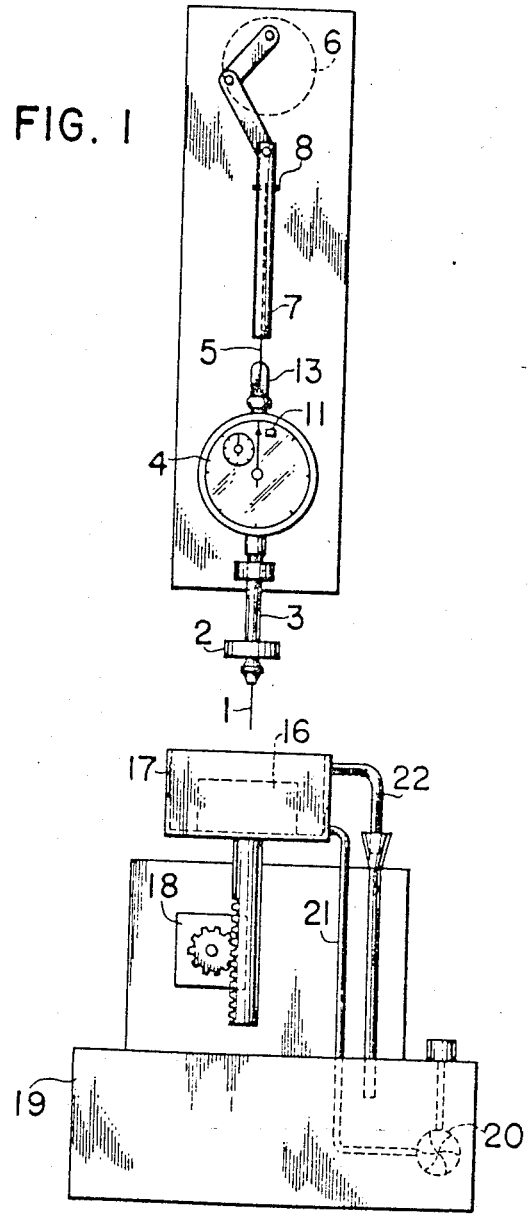

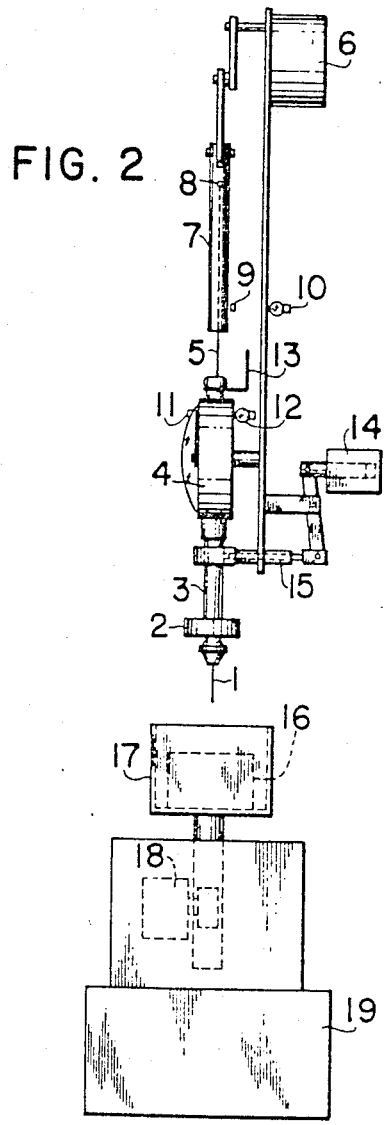

METHOD AND APPARATUS FOR MEASURING PENETRATION AUTOMATICALLY

DESCRIPTION

This invention relates to a method and an apparatus for automatically measuring penetration of pasty materials such as petroleum asphalt. More particularly, this invention relates to a method for measuring penetration of pasty materials such as petroleum asphalt, in which the vertical contact of a needle for penetration test with the surface of a sample is made accurately by the use of an elastic yarn, and personal measuring errors are eliminated and the efficiency of operation is improved by using photoelectric relays and automatizing the whole measuring operation, and also relates to an apparatus useful for performing the same method.

Heretofore, in the measurement of penetration of petroleum asphalt or the like, the method of ASTM D5-65 or its modified methods (e.g. JIS, Japanese Industrial Standard, K 2530) has been used. These methods are based on the procedure of causing a specified needle to penetrate vertically from the surface into a sample maintained at a specified temperature for a specified time and measuring the penetration depth of the needle. It is necessary to cause the tip of the needle to contact vertically with the surface of the sample in such a way that it does not give any scar and load to the surface before the penetration of the needle into the sample and this operation requires very much of a skill. Further, the operation for causing the needle to penetrate into the sample for a specified short time may engender appreciable personal errors.

An object of the present invention is to provide a method which enables automatically to make the vertical contact of the tip of the needle with the surface of a sample with exactitude and does not bring about appreciable personal measuring errors and insures an efficient operation in the measurement of penetration of pasty materials.

Another object of the present invention is to provide an apparatus useful for the embodiment of the above-mentioned method.

These objects can be attained by the method and the apparatus of the present invention in which the vertical contact of the tip of a needle with the surface of a sample is made accurately by the use of an elastic yarn and personal measuring errors are eliminated and the efficiency of operation is improved by automatization of the whole measuring operation by the use of photoelectric devices.

The present invention consists in a method comprising steps: (1) actuating a photoelectric relay by shielding light with a light-shielding plate fixed on the top of the stem of a dial gauge which is raised with the starting of a timer and then actuating another photoelectric relay by shielding another light with the pointer of the dial gauge which revolves concurrently with the rise of the stem of the dial gauge to stop the rise of the needle, (2) causing a table carrying a sample at a fixed temperature to approach the needle point, and stopping the rise of the sample table by the photoelectric relay actuated by the pass of light, following the displacement, from the shielding position on the dial gauge glass, of the pointer of the dial gauge which is so preset as to indicate the zero point of the dial gauge with a high sensibility when the tip of the needle contact vertically with the surface of the sample, (3) and then causing the needle to penetrate vertically from the surface into the sample for a specified time in response to the stopping of the rise of the sample table and reading a penetration depth by the indication of the pointer of the dial gauge, in the measurement of penetration of pasty materials carried out by using a needle for penetration test, a weight and the stem of a dial gauge these of which are made into a combination and an elastic yarn which suspends these parts above mentioned.

The present invention also consists in a wholly automatized apparatus for measuring penetration of pasty materials, which comprises a needle for penetration test, a weight and the stem of a dial gauge these of which are made into a combination and an elastic yarn which suspends these parts above mentioned, a photoelectric relay actuated by shielding light from a corresponding light source with a light-shielding plate fixed on the top of the stem of the dial gauge which is raised with the starting of a timer, another photoelectric relay actuated to stop the rise of the needle by shielding light from another corresponding light source with the pointer of the dial gauge which revolves concurrently with the rise of the stem of the dial gauge and a table carrying a sample at a fixed temperature which is raised so as to contact with the needle point in response to the stop of the rise of the needle and rising of which is stopped by the photoelectric relay actuated by the pass of light, following the displacement, from the shielding position on the dial gauge glass, of the pointer of the dial gauge which is so preset as to indicate the zero point of the dial gauge with a high sensibility when the tip of the needle contacts vertically with the surface of the sample.

A clear conception of the several features constituting the present invention and of the steps of the improved method as well as the details of the apparatus for performing such steps, may be had by referring to the drawings accompanying and forming a part of this specification.

FIG. 1 is a schematic elevational front view of an apparatus for automatically measuring penetration.

FIG. 2 is a schematic elevational side view of the same apparatus.

As indicated in FIG. 1, a needle 1 for measuring penetration is made into a combination with a weight 2 and the stem of a dial gauge 3 and this combination is suspended by an elastic yarn 5. This elastic yarn 5 passing through the inside of a pipe 7 is connected to a rod 8 fixed at the top of a cylindrical pipe 7. This pipe 7 performs up-and-down motion by means of a motor 6. The elastic yarn 5 is used in order to detect the first contact of the tip of the needle 1 with the surface of a sample very sensitively. As elastic yarns for this purpose, a fine yarn having a suitable elasticity and strength such as that of nylon, other synthetic fiber, silk or the like is useful.

The measurement is performed full automatically by the use of a timer. The operation method will be explained hereinafter. The first position of the needle is determined by the use of two photoelectric elements 9 and 11 with their respective light sources 10 and 12 and photoelectric relays which are connected to the above-mentioned elements, and are related electronically with each other. Namely, when the temperature of a sample is brought to a specified point, the motor 6 works to raise the needle 1 with the starting of the timer. When the tip of the needle 1 approximately reaches a given position, a light-shielding plate 13 shields the light from the light source 10 and cause the photoelectric element 9 to detect the shielding of light by which the corresponding photoelectric relay is actuated. Then, with the further rise of the tip of the needle, the pointer of the dial gauge 4 revolves and shields the light from the light source 12 and causes the photoelectric element 11 to sense the shielding of light by which the corresponding photoelectric relay is actuated. By connection with the actuation of the above-mentioned two photoelectric relays, the rise of the needle 1 is stopped followed by the stop of the motor 6.

The mutual relation of the photoelectric relays in this step will be explained hereinafter. The two photoelectric relays are in this step electrically connected in direct series and such an arrangement is made that the electrical circuit is made only when both of the relays are brought into the actuated state.

In response to the stop of the revolution of the motor 6, another motor 18 is stated to raise a sample placed in s sample container 16 set on a sample table 17 in order to contact the surface of the sample vertically with the tip of the needle 1. B this contact, the elastic yarn slackens instantly and causes the pointer of the dial gauge 4 to be displaced sensitively, by which the pointer of the dial gauge 4 comes off the photoelectric element 11 so as to indicate the zero point of the dial gauge as is adjusted previously. Thus, the photoelectric element 11 senses the light from the light source 12, the corresponding photoelectric relay is responded to stop the rotation of the motor 18, and the contact of the surface of the sample with the tip of the needle 1 is maintained and solenoid 14 is excited by the response to clutch the stem 3 of the dial gauge 4 with a stopper 15.

Then, by response, penetration operation is started. At first the elastic yarn 5 is slackened, the excitement of the solenoid 14 is stopped, the stopper 15 of the dial gauge is declutched from the stem 3 and the needle 1 together with the weight 2 and the stem 3 of the dial gauge is allowed to penetrate for a specified time by gravity.

After elapse of a specified time, the stopper 15 is clutched again by the solenoid 14 and the penetration of the needle 1 into the sample is stopped. The reading of the pointer of the dial gauge 4 gives penetration depth. In order to keep the sample at a specified temperature, the sample table 17 is used, which is maintained at a specified temperature by a water bath 19 with a thermostat, a circulating pump 20 for water of the specified temperature, a flexible feedpipe 21 of water of the specified temperature 21 and an outflow pipe 22.

As for the photoelectric elements used in the apparatus of the present invention, such small sized ones as photoconductive cells, phototransistors, photoelectric cells or the like are useful.

As for the automation apparatus used in combination with photoelectric rays, a conventional time-controlling apparatus can be employed.

I claim:

1. In the method of measuring the penetration of pasty materials, such as asphalt, in which a sample to be measured is carried into contact with a penetration element by a vertically movable table, the improvement comprising: determine the contact point including the steps of:
    a. elastically suspending said penetration element;
    b. raising said penetration element to a predetermined point;
    c. raising said vertically movable table until said sample contacts said penetration element thereby causing slight movement of said penetration element;
    d. detecting said movement of said penetration element; and
    e. stopping said movement of said table in response to detection of said movement of said penetration element thereby determining the contact point.

2. Apparatus for measuring the penetration of pasty material, such as asphalt, in which a sample to be measured is carried into contact with a penetration element by a vertically movable table, the improvement comprising:
    means for determining the point of contact between said penetration element and said sample including,
    a. means for elastically suspending said penetration element,
    b. means for raising said penetration element to a predetermined point,
    c. means for raising said vertically movable table until said sample contacts said penetration element thereby causing slight movement of said penetration element,
    d. means for detecting said movement of said penetration element, and
    e. means for stopping the movement of said table in response to the detection of said movement of said penetration element, thereby determining the contact point.